(12) United States Patent
Feast

(10) Patent No.: US 8,177,187 B2
(45) Date of Patent: May 15, 2012

(54) VALVE

(76) Inventor: Martin John Feast, Liphook (GB)

( * ) Notice: Subject to any disclaimer, the term of this patent is extended or adjusted under 35 U.S.C. 154(b) by 438 days.

(21) Appl. No.: 12/224,099

(22) PCT Filed: Feb. 20, 2007

(86) PCT No.: PCT/GB2007/000579
§ 371 (c)(1),
(2), (4) Date: Aug. 18, 2008

(87) PCT Pub. No.: WO2007/107692
PCT Pub. Date: Sep. 27, 2007

(65) Prior Publication Data
US 2009/0101861 A1 Apr. 23, 2009

(30) Foreign Application Priority Data
Mar. 17, 2006 (GB) .................................. 0605408.4

(51) Int. Cl.
*F16K 7/04* (2006.01)
(52) U.S. Cl. ..................... 251/8; 251/7; 251/9
(58) Field of Classification Search .................. 251/7, 8, 251/9; 128/885; 606/120
See application file for complete search history.

(56) References Cited

U.S. PATENT DOCUMENTS

| | | | |
|---|---|---|---|
| 43,194 A | 6/1864 | Glasser | |
| 582,027 A * | 5/1897 | Smith | 251/8 |
| 950,111 A | 2/1910 | Miner | |
| 2,008,440 A * | 7/1935 | Fisher | 251/8 |
| 2,114,903 A * | 4/1938 | Hoppenstand | 606/120 |
| 2,618,270 A * | 11/1952 | Pearson, Jr. | 128/885 |
| 2,680,000 A * | 6/1954 | Pulver | 251/8 |
| 2,686,520 A * | 8/1954 | Jarvis et al. | 606/120 |
| 2,865,591 A * | 12/1958 | Holinshead | 251/8 |
| 3,171,184 A * | 3/1965 | Posse | 606/120 |
| 3,203,421 A * | 8/1965 | Bialick | 128/885 |
| 3,570,531 A * | 3/1971 | McGay | 137/556 |
| 4,978,100 A | 12/1990 | Pleurifoy | |
| 5,353,623 A * | 10/1994 | Bobenhausen | 72/402 |
| 7,159,838 B2 * | 1/2007 | Champagne et al. | 251/7 |
| 2004/0200985 A1 | 10/2004 | Lipscomb | |
| 2005/0241651 A1* | 11/2005 | Rennich | 128/885 |
| 2007/0102658 A1* | 5/2007 | Grimes | 251/9 |

FOREIGN PATENT DOCUMENTS
FR 595673 A 10/1925

* cited by examiner

*Primary Examiner* — John Fristoe, Jr.
*Assistant Examiner* — Marina Tietjen
(74) *Attorney, Agent, or Firm* — Lambert & Associates; Gary E. Lambert; David J. Connaughton, Jr.

(57) ABSTRACT

A valve for restricting and closing plastic tubing, comprising a base having a surface for holding a plastics tube, two side guides extending from the base, a top provided with a restriction member and means for raising and lowering the restriction member on to a seat. One of the side guides is pivotally connected to the base and connectable to the top. The top having a bifurcation to accept the guide, a seat being provided on the bifurcation to hold a head on the side guide. The valve can be placed round a plastics tube and the restriction member positioned to set the flow through the tube. To remove the valve from the tubing, depression of the top releases the head of the side guide from its seat opening the valve.

10 Claims, 3 Drawing Sheets

VALVE

CROSS REFERENCE TO RELATED APPLICATION

This application is for entry into the U.S. National Phase under §371 for International Application No. PCT/GB2007/000579 having an international filing date of Feb. 20, 2007, and from which priority is claimed under all applicable sections of Title 35 of the United States Code including, but not limited to, Sections 120, 363 and 365(c), and which in turn claims priority under 35 USC 119 to U.K. Patent Application No. 0605408.4 filed on Mar. 17, 2006.

BACKGROUND OF THE INVENTION

The present invention relates to a valve for restricting and closing plastic tubing, particularly though not exclusively for use in the pharmaceutical and biotechnology industries.

DESCRIPTION OF THE RELATED ART

The object of the present invention is to provide an improved valve for use with plastics tubing.

SUMMARY OF THE INVENTION

According to the invention there is provided a valve for a plastics tube comprising
  a base, having a concave surface for holding a plastics tube;
  two side guides, extending from the base;
  a restriction member, for restricting the plastics tube and being supported by the side guides;
  a top, opposite the base, connectable to the side guides and carrying the restriction member, and
  means on the top for raising and lowering the restriction member onto the seat,
  one of the side guides being pivotally connected to the top, and the other guide being pivotally connected to the base and connectable to the top, the top including a bifurcation to accept the guide and a seat to hold a head of the side guide.

In use the valve is placed around a plastics tube, with the tube positioned in the concave surface. With the top connected to the side guides, the restriction member will be in contact with the plastics tube, ensuring that the head of the side guide is held in the seat on the bifurcation in the top. To open the valve, the head is pressed down, releasing the side guide which can pivot away from the base allowing removal of the tube. In use, the flow within the plastics tube can be restricted or even stopped by moving the restriction member along the guides onto the plastics tube, and compressing the latter into the concave surface.

Preferably the head on the side guide will be in the form of a bar, with the seat on the bifurcation in the head being an indentation. In addition, the bar may be provided with a boss sized to fit into the bifurcation in the head.

Preferably the valve is made entirely out of plastics material.

Typically the means for raising and lowering the restriction member will be a screw thread.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 1:
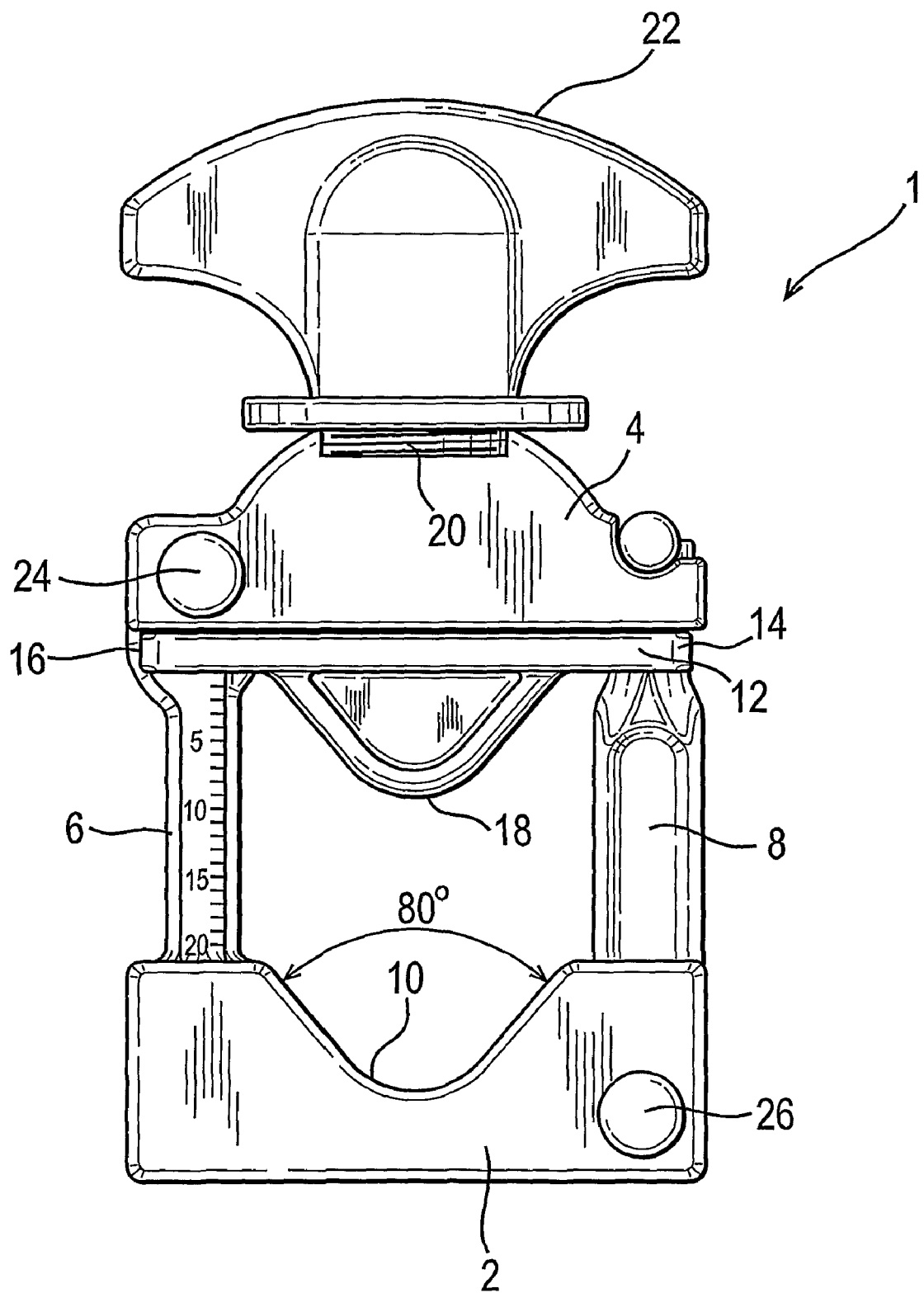
FIG. 1 is a front view of a clamp according to the invention.
Figure 2:
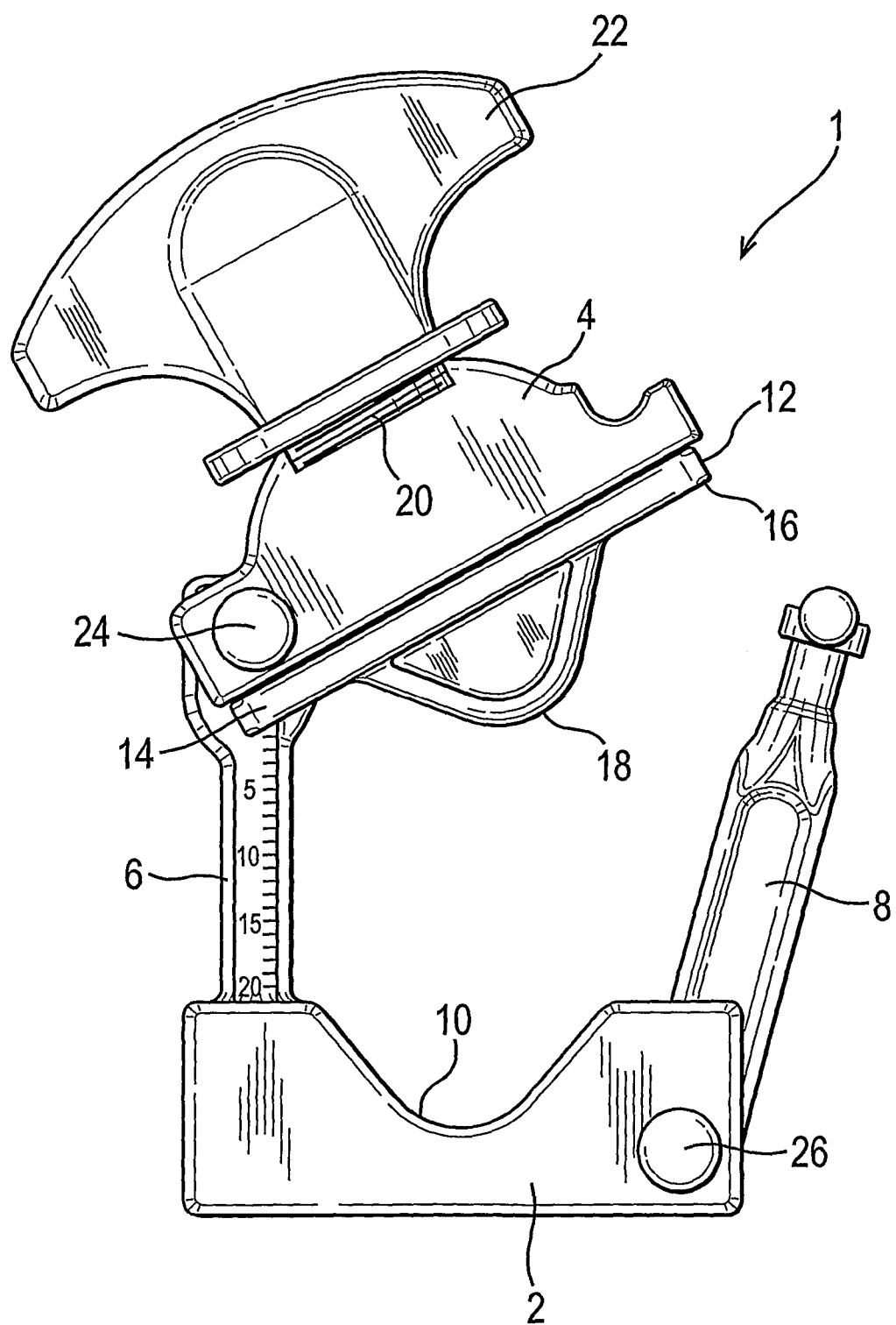
FIG. 2 is a front view of the clamp of FIG. 1 open.

Referring to FIGS. 1 and 2, the valve 1 thereshown includes a base 2, a top 4, and two side guides 6, 8. The base is provided with a concave surface 10 for seating a plastics tube in use (not shown).

The valve also includes a restriction member 12 connected to the top 4 but a screw thread. The restriction member 12 comprises a plate member 14 of substantially rectangular shape, but provided with notches 16 to fit round the side guides 6, 8. Mounted on the underside of the plate 14 is a compression member 18, which is of convex surface and conforms to the concave surface 10 of the base. In use, a plastics tube is compressed in use, restricting the flow through the tube.

The plate 14 is attached to the top 4 via a screw thread, 20 allowing the plate 14 to be advanced and receded, while being held in position by the side guides 6, 8. The screw thread 20 is actuated by a knob 22 mounted on the top 4.

As shown in FIGS. 1 and 2, one of the side guides 6, is fixed to the base 2, while the other side guide 8 is pivotally attached 24 to the base. The first side guide 6 is furthermore pivotally attached 26 to the top 4, while the second side guide 8 is detachable from the top 4.

Figure 3:
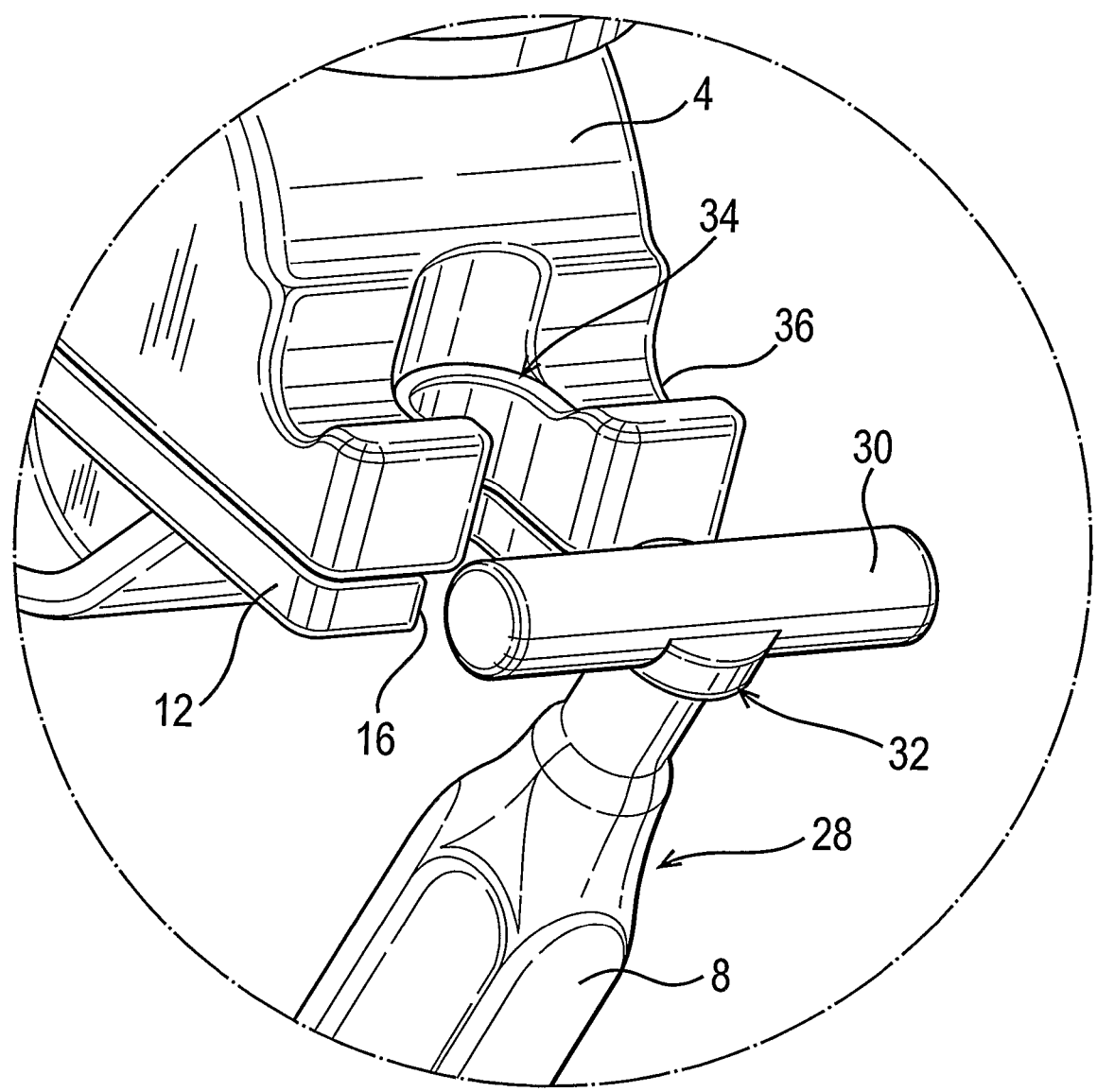
FIG. 3 is a perspective view of head of a side guide and the bifurcation in the top according to the invention.

Turning now to FIG. 3, the upper section 28 of the side guide 8 thereshown, is provided with a head 30 in the form of a bar and a boss 32. The corresponding section of the top 4 is bifurcated 34 and provided with a seat 36 for the head 30 of the side guide.

In use, with a plastic tube placed in the valve, the plastics tube presses on the concave surface on the base 2 and on the convex surface of the compression member 18, urging them apart. This in turn urges the head 30 of the side guide 8 into the seat 36, keeping the valve together. The restriction member 12 can be advanced or receded but the urging of the plastics tube will always ensure that the head remains in the seat. To release the valve the top must be depressed against the urging of the plastics tube, this releases the head 30 of the side guide 8 off the seat 36, allowing the side guide to be swung away from the top, allowing removal of the plastics pipe.

The valve can be made in several sizes to allow for several sizes of plastics tube. However the provision of a deeply concave surface on the base allows each valve to operate on a range of sizes of plastics tube.

The invention is not intended to be restricted to the details of the above described embodiment.

The invention claimed is:
1. A valve for a plastics tube comprising:
  a base, having a seat for holding a plastics tube;
  two side guides, extending from the base and providing a spacing between a top and the seat of the base;
  a restriction member, for restricting the plastics tube and the restriction member being slideably supported between the side guides, and held in position by the side guides;
  the top being opposite the base, connectable to the side guides and carrying the restriction member;
  means on the top for raising and lowering the restriction member onto the seat,
  one of the side guides being pivotally connected to the top and the other side guide being pivotally connected to the base and connectable to the top serving to secure the side guide in place and limit motion of the top when the other side guide and the top are connected, the top including a bifurcation to accept the side guide and a seat to hold a head of the side guide, the head being stationary with respect to the side guide; and wherein a pressure within the plastics tube presses on the seat and the restriction member such that the head of the side guide is urged into the seat of the top, thereby keeping the valve together.

2. A valve as claimed in claim 1, wherein the head on the side guide will be in the form of a bar, with the seat on the bifurcation in the top being an indentation.

3. A valve as claimed in claim 2, wherein the bar is provided with a boss sized to fit into the bifurcation in the top.

4. A valve as claimed in claim 2, wherein the restriction member is a projection from the top, shaped to seat on the base.

5. A valve as claimed in claim 2, wherein the seat on the base is a concave surface forming an angle of substantially 80° and wherein the restriction member is a convex surface sized to fit the seat.

6. A valve as claimed in claim 1, wherein the valve is made entirely out of plastics material.

7. A valve as claimed in claim 1, wherein the means for raising and lowering the restriction member is a screw thread.

8. A valve as claimed in claim 1, wherein the pressure within the plastics tube is provided by a flow within the plastics tube.

9. A valve as claimed in claim 1, wherein the pressure within the plastics tube is provided by an elasticity of a material of the plastics tube.

10. A valve as claimed in claim 1 wherein the bifurcation of the top is perpendicular to the seat of the top.

* * * * *